United States Patent
Vincent Lau et al.

(10) Patent No.: US 9,426,639 B2
(45) Date of Patent: Aug. 23, 2016

(54) BEACON ASSISTED COMMERCIAL RECOGNITION SYSTEM

(71) Applicant: LAIVALUE LIMITED, Hong Kong (CN)

(72) Inventors: Man Kin Vincent Lau, Hong Kong (CN); Man Shing Kwan, Hong Kong (CN)

(73) Assignee: LAIVALUE LIMITED, Kowloon, Hong Kong (CN)

( * ) Notice: Subject to any disclaimer, the term of this patent is extended or adjusted under 35 U.S.C. 154(b) by 0 days.

(21) Appl. No.: 14/535,083

(22) Filed: Nov. 6, 2014

(65) Prior Publication Data

US 2016/0135032 A1    May 12, 2016

(51) Int. Cl.
*H04W 8/00*     (2009.01)
*H04W 76/02*    (2009.01)
*H04W 4/00*     (2009.01)

(52) U.S. Cl.
CPC .............. *H04W 8/005* (2013.01); *H04W 4/008* (2013.01); *H04W 76/023* (2013.01)

(58) Field of Classification Search
None
See application file for complete search history.

(56) References Cited

U.S. PATENT DOCUMENTS

| | | | | |
|---|---|---|---|---|
| 5,311,596 A | * | 5/1994 | Scott | G06F 21/31 380/266 |
| 2008/0051059 A1 | * | 2/2008 | Fisher | G06Q 20/20 455/410 |
| 2009/0088077 A1 | * | 4/2009 | Brown | H04W 88/06 455/41.2 |

* cited by examiner

*Primary Examiner* — Alejandro Rivero
(74) *Attorney, Agent, or Firm* — Howison & Arnott, LLP

(57) ABSTRACT

A system, comprising a primary communication path, a first communication device interfaced with the primary communication path, a second communication device interfaced with the primary communication path for communicating over the primary communication path to the first communication device, a controller for controlling the communication path between the first and second communication devices to allow or inhibit communication there over, a validation communication path, a first validation node interfaced with the validation communication path, a second validation node interfaced with the validation communication path for communicating with the first validation node over the validation communication path where in the presence of a transmission between the first and second validation nodes over the validation communication path constitutes a validation condition to control the mode of operation of the communication to be at least one of inhibiting communication over the primary communication path or allowing communication over the primary communication path.

9 Claims, 11 Drawing Sheets

BEACON ASSISTED COMMERCIAL RECOGNITION SYSTEM

TECHNICAL FIELD

The present invention pertains in general to the use of beacons and more particularly to the use of beacons in a commercial environment for recognizing the presence of mobile units within an area.

BACKGROUND

Currently, there are a number of Beacon type applications wherein a radio frequency (RF) transmitter is disposed within a location to operate as a beacon. This beacon may contain simply an ID or data. There are a number of beacons that could be provided. Some utilize Bluetooth technology and some utilize Zigbee technology. The Bluetooth technology has recently evolved to low energy Bluetooth (BLE) which operates at a low data rate and a low power rate. These beacons can transmit energy from certain locations and a mobile unit such as a PDA or smartphone can recognize the presence of these beacons and identify these beacons without actually communicating with that beacon. These beacons can be utilized to provide location information via some kind of lookup table whereby the ID is recognized and compared to a table and then location information is determined therefrom. Other beacons can be utilized to locate personal items by recognizing that the beacon is either very close to a mobile unit or scanning device or at a distance therefrom. This is facilitated via the use of the received signal strength (RSS).

BRIEF DESCRIPTION OF THE DRAWINGS

For a more complete understanding, reference is now made to the following description taken in conjunction with the accompanying Drawings in which.

DETAILED DESCRIPTION

Figure 1:
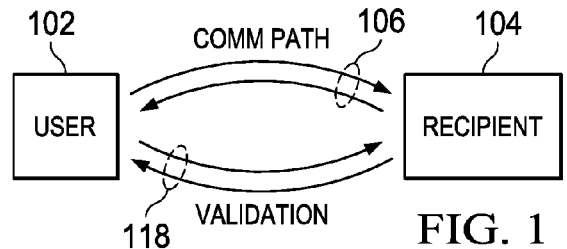
FIG. 1 illustrates an overall diagrammatic view of the system.

Referring now to the drawings, wherein like reference numbers are used herein to designate like elements throughout, the various views and embodiments of Beacon Assisted Commercial Recognition System are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated in overall view of the system of the present disclosure. There is provided a user 102 which interfaces with a recipient 104. There are two paths by which communication can be provided. One path is a communication path 106 and the other path is a validation path 118. The communication path 106 is a bidirectional communication path as well as the validation path 118 being bidirectional. As will be described hereinbelow, when the user 102 is in proximity to the recipient 104, a validation path 118 is made possible when validation occurs over that path. This validation path is maintained in a continuous and connected mode, such that there is a proprietary handshake associated with the presence of the communication path. This presence of the validation communication path and the presence of a handshake on a continued basis (or lack thereof) will affect how communication is conducted over the communication path 106 or just the presence of the communication path 106.

Figure 2:
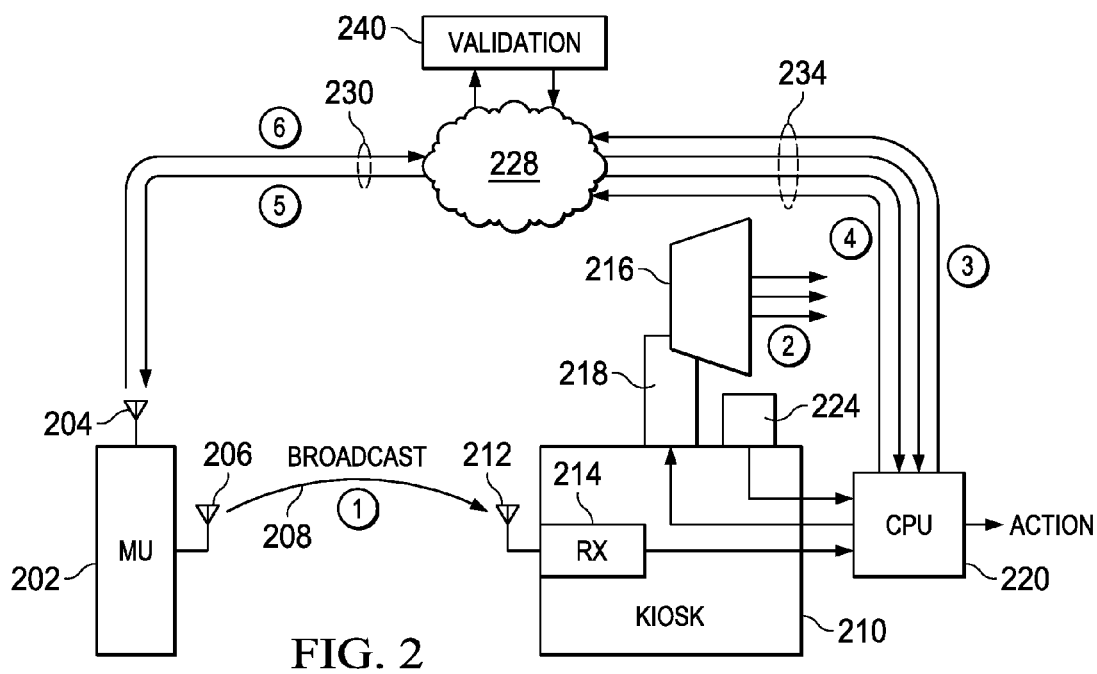
FIG. 2 illustrates a diagrammatic view of a mobile unit and a kiosk communicating through the cloud.

Referring now to FIG. 2, there is illustrated a diagrammatic view of one implementation of the presently disclosed system. A mobile unit (MU) 202 is provided that is a device that a user carries on their person such as an PDA, smart phone or the such. This MU 202 contains two antenna, an antenna 204 and an antenna 206. The antenna 206 is associated with a first radio in the MU 202 and there is a second radio associated with the antenna 204. The antenna 206 is associated with a broadcast path 208 that communicates with a kiosk 210. The kiosk 210 has an antenna 212 associated therewith for receiving a broadcast from the antenna 206. The kiosk has a receiver 214 associated with the antenna 212. The kiosk 210 has a display 216 associated therewith which is associated with a point of sale (POS) system 218. There is provided in association with the kiosk 210 a CPU 220. The CPU 220 communicates with the receiver 214 and the POS 218. There is also provided a keyboard 224 that interfaces with the CPU 220.

The second antenna 204 on the MU 202 communicates with a cloud network 228 via a bidirectional path 230. Similarly, the CPU 220 communicates with the cloud 228 via a network path 234. This is via a typical Internet connection path utilizing a modem or router which is local to the CPU 220. This modem or router is not shown.

In operation, the MU 202 approaches the kiosk 210. When the MU is within broadcast range of the receiver 214, the receiver 214 can receive information from the MU 202. The broadcast from the MU 202 contains information identifying the MU 202. If the MU 202 has a Bluetooth low energy radio space "BLE," this radio, a low energy radio, will broadcast a unique ID associated with that radio, in addition to unique information that identifies the running of a proprietary application on the MU 202. The receiver 214 will receive a broadcast and extract therefrom the unique ID of the radio and the unique information that is embedded therein proprietary to an application running on the user's device or the MU 202. The kiosk 210 could have a database that is contained locally in association with the CPU 220 to allow it to look up and determine if the MU 202 is within the proprietary system. If so, this would indicate that the MU 202 is a valid MU in the system. In general, the Bluetooth radio will have its own unique ID. On the MU 202, there will be running an application which will have a proprietary system ID or some type of identification information associated with a proprietary application running on the MU 202. This identification information will be combined with the unique ID of the Bluetooth kiosk 210 which the kiosk needs to determine if this is a valid MU.

In the embodiment illustrated in FIG. 2, a display will be output from the display 216 to the operator at the kiosk, indicating that the presence of a transmitting MU has been detected. The information will be extracted from the broadcast information and transmitted along a path "3" to the cloud 228. The cloud 228 will then interface with a validation server 240 in order to send the extracted information thereto for validation purposes. If this is a valid MU and the information extracted therefrom corresponds to an existing subscriber to the system, an indication of a valid user or subscriber will be transmitted back to the CPU 220 and also information associated with that user, such as user profile information, photographs, etc., will be transmitted back to the CPU 220. This occurs along a path "4." The CPU 220 will receive the validation indication and also the information regarding the user, if that is transmitted. If user information is transmitted from the validation server 240, this information can then be provided to the display 218 in order to allow the clerk that is manning the kiosk to receive information about that user via the display 216. Once this occurs, the CPU 220 has information that allows it to connect to the MU 202. A communication path will be effected along the path 230 with information received by the MU 202 from the CPU 220 via a path "5" and then information returned from the MU 202 to the CPU 220 via a path "6." This, in effect, creates a secure communication between the kiosk 210 via the CPU 220 and the MU 202. This communication path then allows the kiosk 210 to facilitate a commercial transaction or some type of action with the MU 202. As long as the validation path is maintained, the communication path along path 230 will be maintained. If, for some reason, the MU 202 travels out of range of the kiosk 210, the validation path would be broken because the broadcast link 208 is broken. In this example, there is only a single direction broadcast of information from the MU 202. There is no handshake in this particular operation.

As an example of the operation illustrated in FIG. 2, one application could be a commercial transaction wherein the presence of the MU 202 was recognized via the validation operation and then a communication link completed to facilitate some type of action such as a sale. This is a commercial transaction. The transaction could be achieved because the photograph of the user associated with the MU 202 was displayed on the display 216. As long as the MU 202 was in proximity to the kiosk 210, as recognized by the presence of the broadcast signal along the path 208, the transaction could be continued and some type of action completed.

Figure 3:
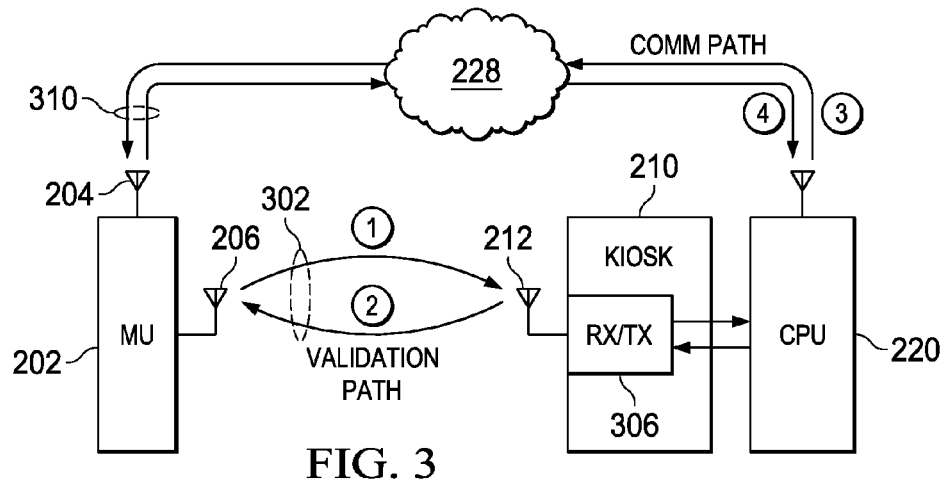
FIG. 3 illustrates a view illustrating the validation path between the mobile unit and the kiosk.

Referring now to FIG. 3, there is illustrated in alternate embodiment. In this embodiment, the MU 202 interfaces with the kiosk 210 via a bidirectional communication path 302. The MU 202 has an internal transmitter/receiver associated with the antenna 206. The kiosk 210 has associated therewith a transmitter/receiver 306 that interfaces with the antenna 212. The antennas 206 and 212 communicate via the path 302. The CPU 220 is able to connect with the MU 202 via the cloud 228 and the path 310. In this embodiment, the validation of the MU 202 with the kiosk 210 is facilitated by a proprietary handshake. The kiosk 210 extracts the information received from the MU 202 by a transmit path "1" which contains both radio ID information from the radio associated with the MU 202 and also unique handshake information that both identifies the application running on MU 202, this being a proprietary application, and algorithmic information from a handshake operation running on the MU 202. The kiosk 210, of course, has a corresponding base application running that is proprietary to the overall operation.

Once a validation path is facilitated via the path "1," the kiosk 210 will return information along a path "3" to the MU 202. This information is part of a handshake algorithm. This handshake algorithm is an algorithm that has both proprietary information contained therein and also temporal information. As long as the communication path 302 is maintained and this handshake algorithm is being executed on both the kiosk 210 and the MU 202, the CPU 220 can facilitate a communication path with the MU 202. This communication path can be facilitated via some type of wireless link between the CPU 220 and the cloud 228 or it can be a hardwired connection. Any conventional communication path for allowing a data link to be created can be used. In this implementation, no validation is required to determine if the user is a valid user; rather, all that is important is that a proprietary application is running on the MU 202 that can communicate with a proprietary application running on the kiosk 210. There can, of course, be local information stored in the kiosk 210 that allows information to be pulled up with respect to a particular user, if it exists within a local database. Of course, there can also be contained therein a link to an external server (not shown) to obtain information about a user or to validate that user as another layer of validation. However, maintaining the connection 302 is important in that it provides a control link that must be present in order to maintain the communication path between the kiosk 210 and the MU 202 in order to facilitate some type of commercial transaction, some type of data transfer transaction, etc.

Figure 4:
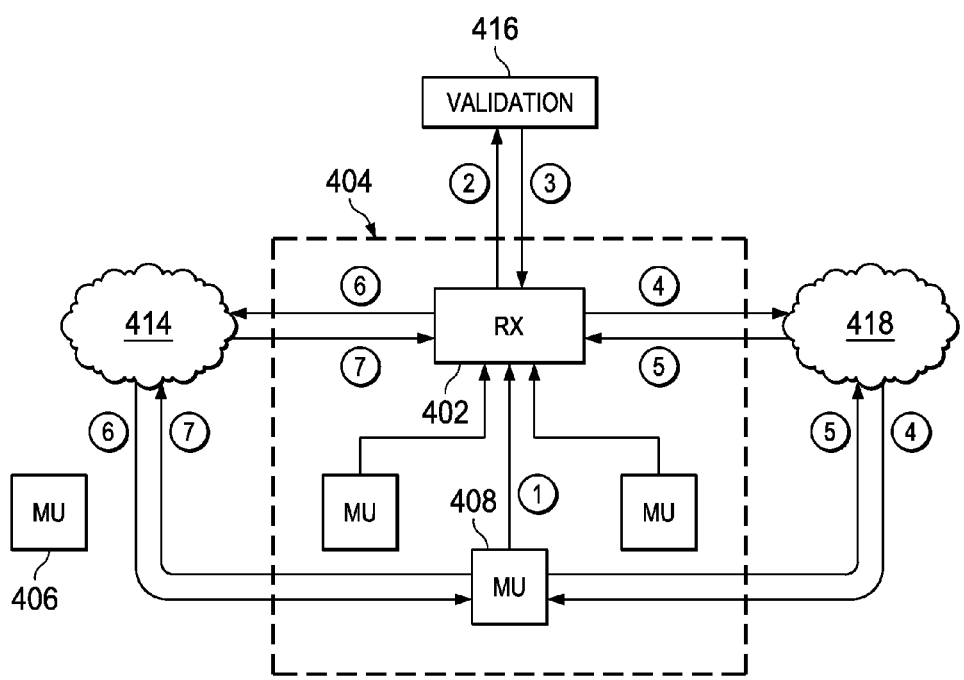
FIG. 4 illustrates a diagrammatic view of a plurality of mobile units within a localized environment.

Referring now to FIG. 4, there is illustrated a diagrammatic view of a given environment for recognizing a plurality of different MUs. There is defined a receiver node 402 that corresponds to the kiosk 210 as noted above. This kiosk 402 has a receiver for receiving the broadcast information from any of the MUs within a receiving range of the receiver node 402. The receiving range of the receiver node 402 is represented by a dotted line 404. This is basically a function of the received characteristics of the receiver at the receiver node 402. This is not linear and can be affected by the surrounding environment. There are illustrated three MUs within the dotted line 404 such that any broadcasts therefrom can be received by the receiver 402. There is one MU 406 that is disposed outside of the dotted line 404 and, as such, cannot broadcast information to the receiver node 402. Of the MUs disposed within the dotted line 404, there is one MU 408 that broadcasts information to the receiver node 402 that is recognized by the receiver node 402 as being associated with a proprietary application running on the MU 408. This is because information contained within the transmission has identification information that is proprietary to that application in addition to information unique to the transmitting radio. Of course, the other MUs can broadcast information to receiver 402 in the form of their unique ID and as such. However, the receiver 402 will only recognize the receipt. When this broadcast is received along a path "1," the receiver 402 will send the information along a path "2" to a validation server 410. The validation server 410 will receive this information, validate this information and return a validation acknowledgment back to the receiver 402 along the path "3." The receiver 402, upon receiving a validation information, will then use validation information and the information associated therewith in the form of connection information to the MU 408. This is information such as the IP address or to such. This allows a communication path to be facilitated via a cloud 414. In this embodiment, there are two paths that can be facilitated. The first is a communication link via a second cloud 418 that allows information to be transmitted to the MU 408 via a path "4" and then receives information therefrom via a path "5." The communication along the second path is via the cloud 414 and paths "6" and "7."

Figure 5A:
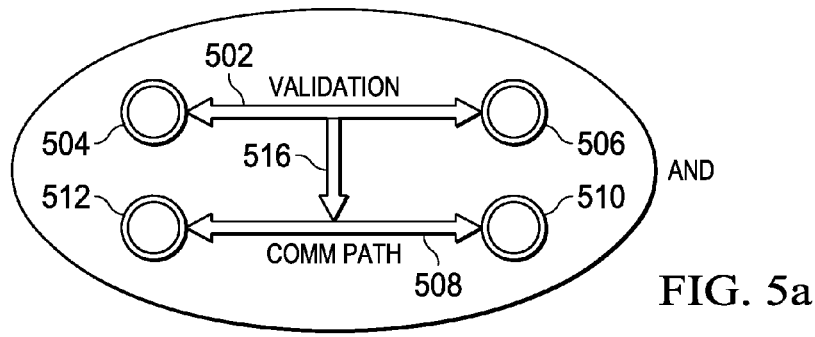
FIG. 5a-FIG. 5c illustrates various configurations for the validation of a communication path.
Figure 5B:
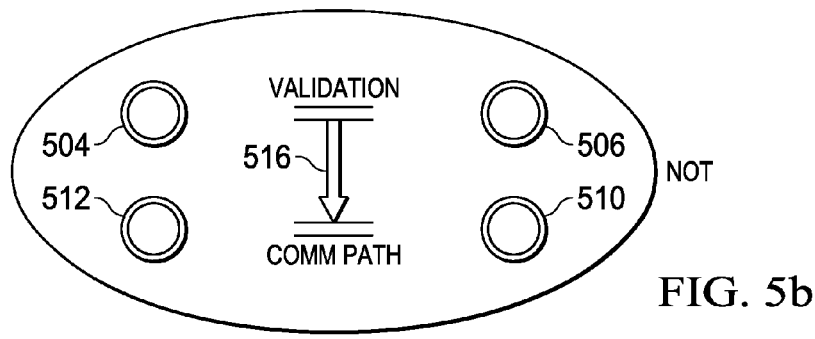
Figure 5C:
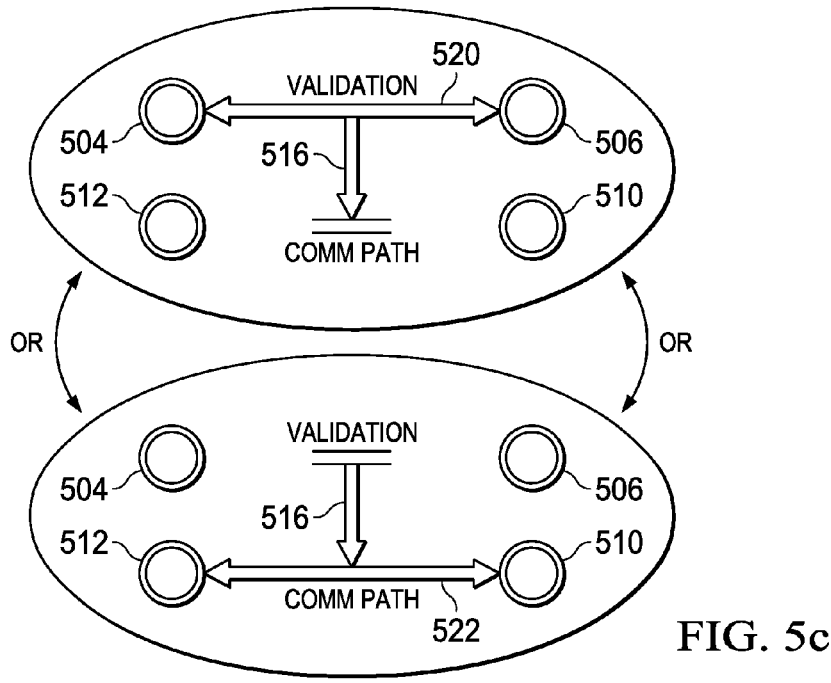

Referring now to FIGS. 5a-5c, there are illustrated three different configurations as to how the validation will control the communication path. In FIG. 5a, there is illustrated embodiment where there is provided a validation path 502 between two nodes 504 and 506. The node 504 is disposed on one side of communication and the node 506 is disposed on the other side of the communication. The node 504 is associated with the MU, for example, and the node 506 is disposed in close association to the kiosk, for example. However, it should be understood that the node 504 can be disposed independent of any node or operation, as well as the node 506 being disposed with any type of node or operation. There will also be provided a communication path 508 that is disposed between a node 510 and a node 512. The node 510 is typically associated with the node 506 and is disposed in close association therewith, but may not be the same device or unit. Similarly, the nodes 504 and 512 are associated with one side of the communication/validation path, but may not actually be part of the same device. Of course, the nodes 504 and 512 can, in one example, be associated with an MU whereas nodes 506 and 510 can be disposed in association with a kiosk, for example.

In operation of this embodiment of FIG. 5a, the functionality is an AND function. When the validation path is present, the communication path can be maintained. If the validation path is broken, then the communication path will be broken. There is a control path illustrated by numeral 516. When the validation path 502 is broken, the communication path 508 will be broken.

In the embodiment of FIG. 5b, the functionality is that of a NOT function. In this operation, the validation path is illustrated as not existing between nodes 504 and 506. In this operation, the control signal will cause the communication path to not exist between the nodes 512 and 510. Thus, if the validation path 502 is present, the communication path is present. If the validation path is not present, the communication path will not be present.

The embodiment of FIG. 5c, there is illustrated an OR functionality. In this operation, there is provided a validation path 520 between nodes 504 and 506 that, when present, results in no communication path between the nodes 512 and 510. When the validation path disappears, as illustrated in the bottom of FIG. 5a, then a validation path 522 will be present. Thus, the validation path will always be present if the device associated with nodes 504 and 506 is not present.

In application of the embodiment of FIG. 5c, an environment such as an elementary school could have a situation wherein all of the students have smart phones. An application could be running on each of the smart phones for each of the students which allows the students to communicate whenever the teacher is absent. When the teacher enters the room, the teacher would have a corresponding smart phone that would broadcast to each of the students' phones a broadcast signal in accordance with the proprietary algorithm running on both the teacher's phone and the students' phones. This would set up a validation path to all of the students' phones which, upon completion, would cause all communication between the students' phones and any other devices to which they were communicating to be disconnected. As long as the validation path is present, communication would be prohibited on the students' phones by prohibiting communication paths to be created.

Figure 6:
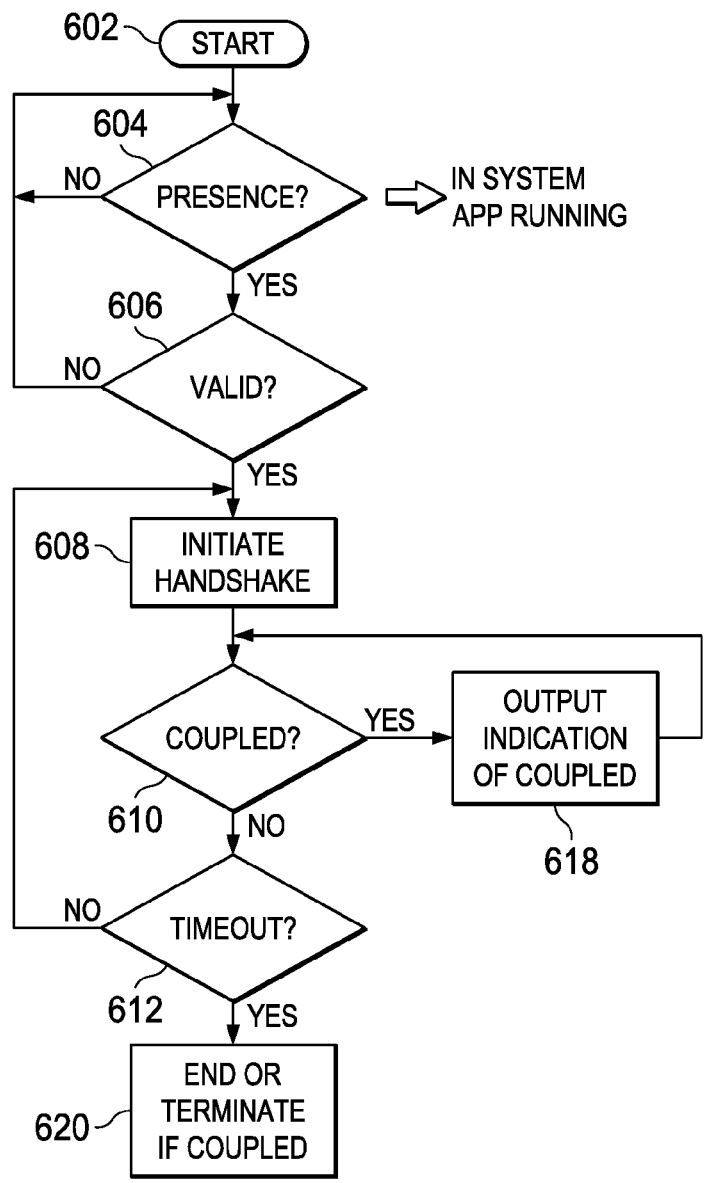
FIG. 6 illustrates a flow chart for a mobile unit.

Referring now to FIG. 6, there is illustrated a flowchart depicting the presence of the first operation in FIG. 5a. The program is initiated at a block 602 and proceeds to a decision block 604 in order to determine the presence of a remote device such as an MU. If the MU is present, the program flows along the "Y" path to a decision block 606 to determine if the MU is valid or if the communication is valid. The presence decision block 604 merely indicates that something is broadcasting information to the radio of the receiving unit. This validation operation is the operation wherein information is extracted from the received signal and then transmitted to some type of validation server. Once there is a determination of a valid signal from a valid or verified user, the program flows along the "Y" path to a function block 608 to initiate a handshake operation. The indication that this is a valid signal from a valid or verified user can merely be the fact that it is noted as being received from a proprietary application, i.e., there is proprietary information over and above the radio ID contained within the received signal. This would be some type of signature associated with a proprietary application. Once this is indicated as being a valid signal, i.e., from a proprietary application, the handshake is initiated in a bidirectional manner to maintain the communication along this path and establish a validation path. The program then flows to a decision block 610 in order to determine if the two systems remain "coupled." If they break the coupling, i.e., the validation path is removed, the program flows along a "N" to a decision block 612 in order to determine if a timeout has occurred. If not, the program flows back to the input of the function block 608 to continue to initiate the handshake. Once a determination is made that the handshake has coupled to devices, i.e., the parameters of the algorithm have been satisfied, for example, then the program will flow to a function block 618 to output an indication of coupled, i.e., this is a valid and complete validation path. If, for some reason, the handshake could not be initiated, then there would be a time out situation where in the program would flow from the timeout decision block 612 along a "Y" path to a function block 620 in order to enter or terminate the operation. This would occur if for some reason the handshake fails. As long as they are coupled and the handshake is continued, they will be coupled.

Figure 7:
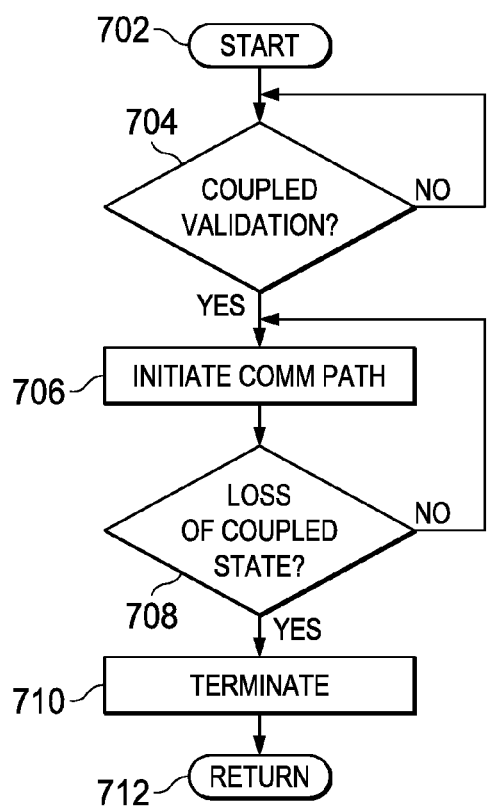
FIG. 7 illustrates a flow chart for the kiosk.

Referring to FIG. 7, there is illustrated a flowchart depicting the operation of the communication path. The program is initiated at a block 702 and proceeds to a decision block 704 in order to determine if there is a coupled validation, i.e., both the presence of the remote unit or the MU is detected and the broadcast is determined to be a valid broadcast from a valid proprietary application. If so, the program proceeds along the "Y" path to the function block 706 in order to initiate that the communication path and then to a decision block 708 in order to determine if there is any loss of a coupled state, i.e., the validation path is broken. If not, the program flows along the "N" path to the input of the function block 706. As long as this validation path or coupled state exists, the communication path will be maintained. If, however, a coupled state is lost due to the remote device moving out of the range of the transmit path in the validation path is broken, the program will flow along the "Y" path to a function block 710 in order to terminate the communication path and then to a block 712 in order to return operation.

Figure 8:
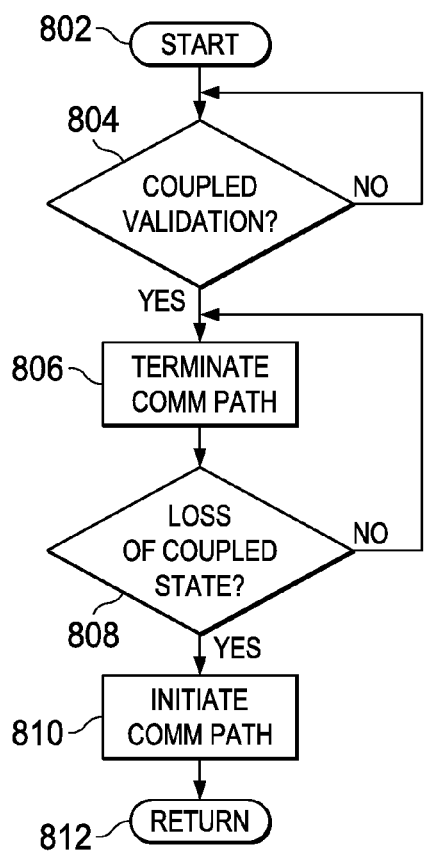
FIG. 8 illustrates a flow chart for an alternate embodiment of the system.

Referring now to FIG. 8, there is illustrated a flowchart depicting the operation of terminating the communication path after a validation path is determined. The program is initiated at a block 802 and proceeds to a decision block 804. This decision block 804 determines if there is a valid validation path that exists, i.e., the two systems are coupled and the device or MU is in the presence of the entity or kiosk, for example. If such is determined, the program flows along the "Y" path to a function block 806 in order to terminate the communication path. In this example, the communication path is present whenever the remote device or MU is not in the presence of the receiving device. Once the validation path is terminated, the program flows to a decision block 808 to determine if there is a loss of the coupled state. If not, the program flows back to the input of the function block 806 along an "N" path. When the coupled state is returned, the program will flow along the "Y" path to a function block 810 in order to initiate the communication path. Thus, this operation involves the situation where a communication path is present between one entity in a remote device or MU and some type of entity such as a kiosk. When the remote device or MU comes within proximity to the entity or kiosk, the communication path will be broken. Understand that the communication path may exist with some other entity. For example, there could be a remote device that was communicating with some other individual and, once a validation path is created due to the presence with an entity such as a kiosk, the communication path to that other third-party is broken. It could, of course, be a communication path with the entity or kiosk. Once the communication path is initiated, the program returns back to the input of the block 804, as indicated by a block 812.

Figure 9:
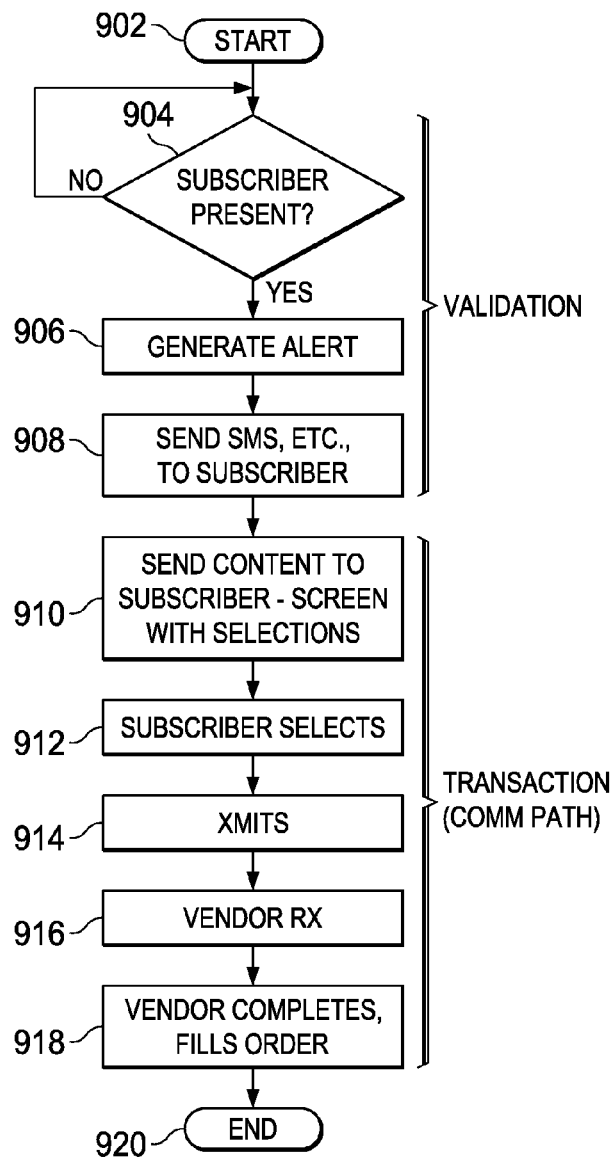
FIG. 9 illustrates a flow chart depicting the overall system operation.

Referring now to FIG. 9, there is illustrated a flowchart depicting the overall operation of validation and completing a transaction on a communication path. This is a commercial transaction, for example. In this flowchart, the initiation is at a block 902 and then proceeds to a decision block 904. In this decision block 904, a determination is made as to whether a subscriber for a particular commercial transaction is present. This might be a transaction at a POS wherein the subscriber would be recognized as being a subscriber for a particular type of commercial transaction wherein funds could be transferred from a third-party. This is information that is provided by a validation path and the operations described hereinabove wherein information from the remote or mobile device associated with the subscriber broadcasts information along a dedicated path to the POS. This is received, sent to a validation server and validated in such a manner that, for example, a photograph could be provided to a clerk at the POS for one level of validation. The program then flows along the "Y" path to a function block 906 in order to generate an alert, i.e., this alert being the photograph, for example. Once this alert has been provided to the clerk or operator of the POS, then an SMS or the such can be sent to the subscriber, as shown in block 908. This may be a situation where in the subscriber has not actually gone to the POS for the purpose of entering into this transaction but, rather, the subscriber has merely been close to the POS. The subscriber may actually be just a subscriber to an application that allows advertising to be "pushed" to that subscriber. This could be in the form of information such as the SMS text or even a displayed advertisement. This operation with respect to the function blocks 902 through 908 is referred to as the validation operation. Thereafter, and once validated, the program flows to a function block 910 in order to send content to the subscriber, such as a screen with a selection option. The program flows to a function block 912 in order to allow the subscriber to select something from this particular screen and then to the function block 914 to transmit the information from the subscriber unit to a vendor, for example. A function block 916 then indicates a receipt by the vendor of this information. It is understood that this may not actually be the vendor that sent the SMS or received the information that indicated that the subscriber was in the presence thereof. The program then flows to a function block 918 in order for the vendor to complete or fill the order. In order to facilitate the operation between function blocks 910 and 918, a communication path must be present, i.e., this is the transaction operation. Thus, once validation is confirmed and maintained, the subscriber can be provided with the information associated therewith and information completed with respect to a vendor in the form of making a selection, for example. This typically requires the subscriber to be in close association with a POS or the such. The program then flows to termination block 920.

Figure 10:
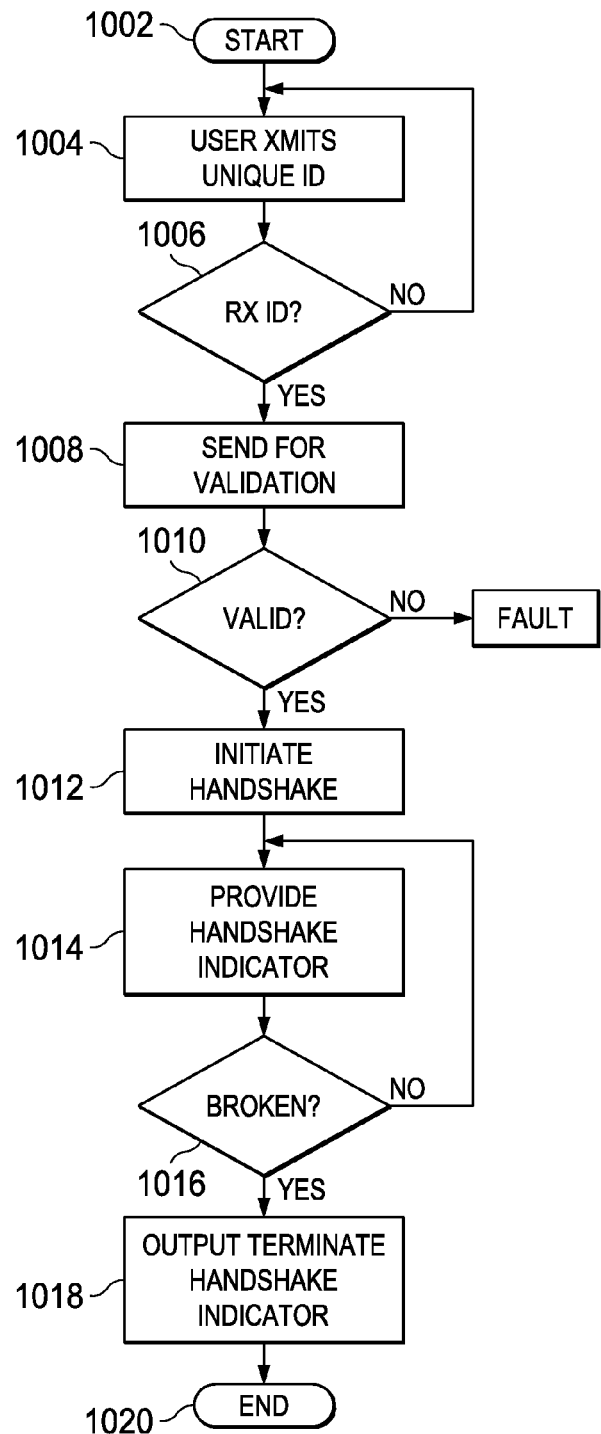
FIG. 10 illustrates a flow chart for a handshake indicator.

Referring now to FIG. 10, there is illustrated a flowchart depicting the operation at the user device. This is initiated at a block 1002 and then proceeds to a function block 1004, wherein the user device or the user transmits ID information associated with an application running on that user's device. There are a number of ways that a user can transmit an ID associated with the proprietary application. The first is to start an application on the user's device which continually runs in in a mode to broadcast the ID of the radio and the unique idea associated with the proprietary application, i.e., the proprietary ID or identification information. The other is to allow a user to transmit the unique ID whenever they are actually in the presence of a particular kiosk or point of interest in order to attempt to complete some type of transaction or to create a validation path.

Once the unique ID is transmitted, the program flows to a decision block 1006 to determine if the unique ID has been received by a receiver at a point of interest or a kiosk or the such. When received, and the program flows along the "Y" path to a function block 1008 wherein the receiving location then transmits this received ID to a validation server in order to validate the user. The program then flows to a decision block 1010 to determine if the ID that was extracted from the transmission from the user is associated with a valid user on the system. If so, the program flows along the "Y" path to a function block 1012 in order to initiate the handshake with the user's device. The program then flows to a function block 1014 in order to provide a handshake indicator that will indicate that a validation path is present. The program then flows to a decision block 1016 in order to determine if the validation path is present or if it has been broken. If not, the program loops back to the input of the function block 1014. When the validation path is broken, the program flows from the decision block 1016 along the "Y" path to a function block 1018 in order to output a terminate of handshake indicator. The program then flows to a block 1020 in order to end the program.

Figure 11:
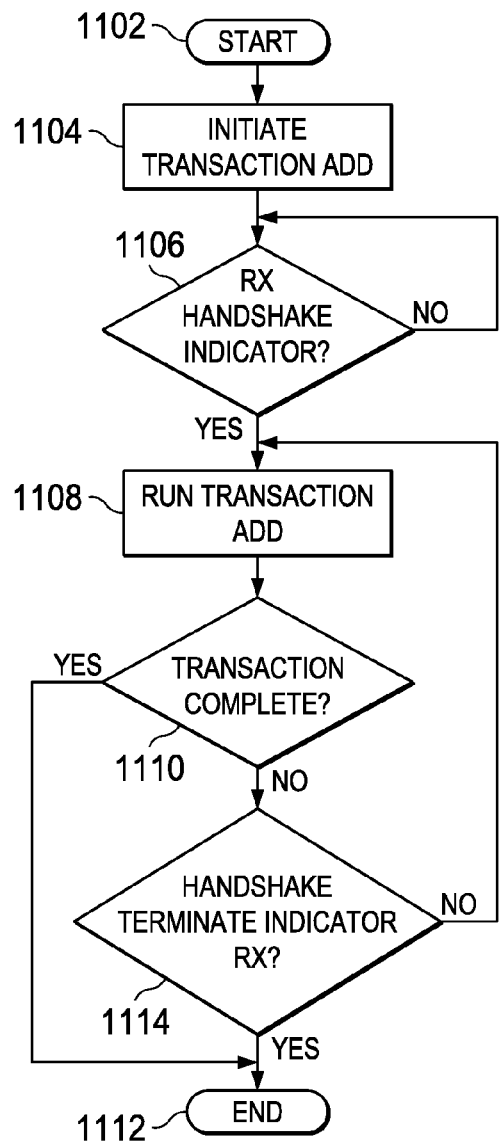
FIG. 11 illustrates a flow chart for the application initiation on the mobile unit.

Referring now to FIG. 11, there is illustrated a flowchart depicting the initiation of a transaction application on a user's device. This is initiated at a block 1102 and then proceeds to a function block 1104 to initiate the transaction application on a user's device. Once the transaction application is initiated, the unique ID associated with the application will be transmitted from the radio in a broadcast that also includes the unique ID of the radio. When this is received by a receiver operating in accordance with the proprietary application, a handshake operation will be initiated. The program then flows from the function block 1104 to a decision block 1106 in order to determine if the handshake indicator has been received by the user's device. When received, the program flows along the "Y" path to a function block 1108 to run the transaction application on the user's handset. In this operation, a particular application that is running on the user's device is one that is associated with some type of transaction, a commercial transaction or the such. A part of this commercial transaction is an operation that is basically directed toward the function of determining if a validation path has been created. Once the validation path has been created, then the program enters into a transaction mode to facilitate the completion of a transaction with the receiving device. In this operation, the particular transaction application will transmit the unique ID that is proprietary to the application which, when received by the receiving device, will indicate to the receiving device that a particular transaction is being conducted. If, for example, this transaction were a particular type of sale, this would be received by the receiving device. For example, the transaction application could be one that sought discounts from a retailer. The retailer would recognize via the receiving device and the received unique ID generated by the application on the user's device that a particular type of transaction associated with this discount was being requested by a particular user's device. By creating a handshake, and the validation path, this allows a transaction to go forward. Once the handshake is accepted in the validation path created, this indicates to the user's device and the application running on a user's device that a transaction can be completed for this transaction, for example, a discount transaction. Once this transaction is complete, as determined by a decision block 1110, the program flows along a "Y" path to a terminate block 1112. Until the transaction is complete, the program will flow along an "N" path to a decision block 1114 in order to determine if the validation path had been broken by the lack of the handshake. If this handshake is not broken, i.e., the validation path has been maintained, the program flows along the "N" path back to the input of the function block 1108 to continue to run the transaction application on the user's device. Once the validation path has been broken or the transaction is complete, the program will flow to the terminate block 1112.

Figure 12:
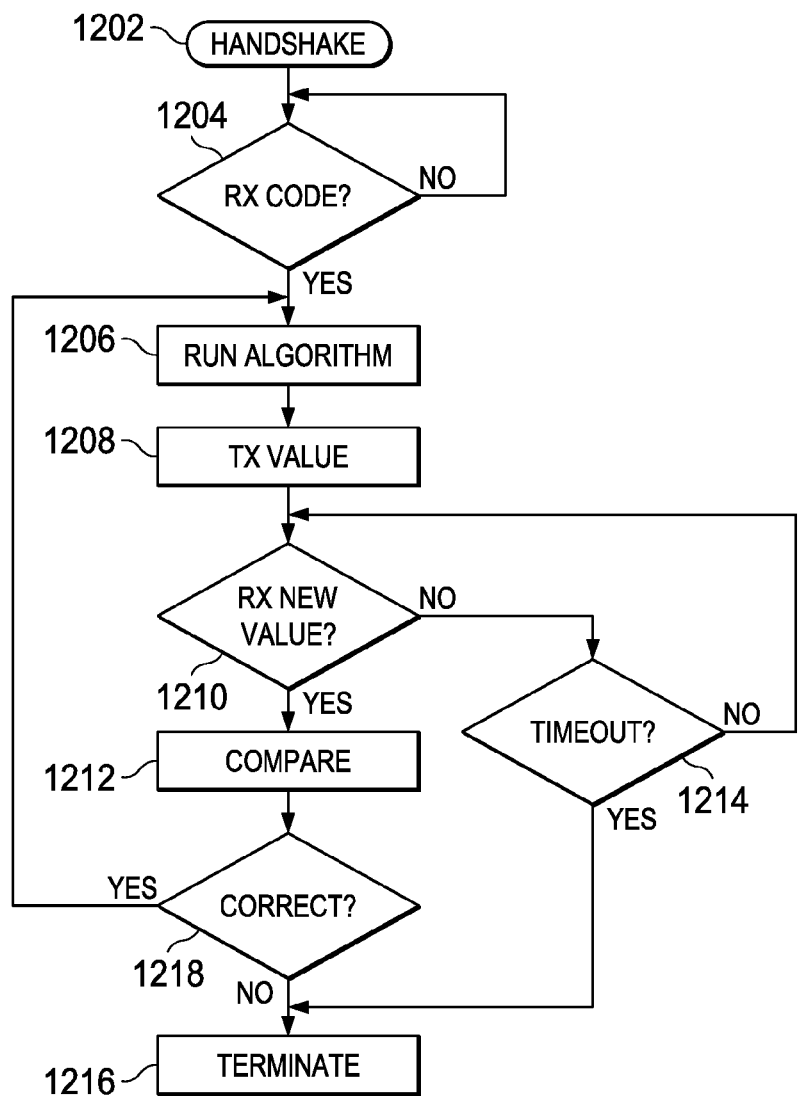
FIG. 12 illustrates a flow chart for the handshake operation.

Referring now to FIG. 12, there is illustrated a flowchart depicting the operation of the handshake. This operation is initiated at a block 1202 and then flows to a decision block 1204 in order to determine if the unique ID code has been received, this unique ID or code being the unique ID or code generated by the proprietary application running on the user's device or the transmitting device. Once received, the program flows along the "Y" path to a function block 1206 and the algorithm is run at the receiving device along a bidirectional path with the user's or transmitting device. The program then flows to a function block 1208. A value is transmitted from the receiving device back to the user's device, which value is utilized by the algorithm, and then a determination is made as to whether the user's device has received a new value, as indicated by a decision block 1210. The program flows along "Y" path from the decision block 1210 when a new value has been received and then a compare function is performed at a function block 1212. If a new value has not been received, the program will flow from the decision block 1210 to a timeout decision block 1214 along an "N" path to wait for the new value. If a timeout occurs, the program will flow to a terminate block 1216. If the new value has been received, however, the compare block 1212 then compares this with an expected value in accordance with a corresponding portion of the proprietary handshake algorithm running on the user's device and, if this is correct, as determined by a decision block 1218, the program will continue to run the algorithm to ensure that the handshake is a continuing handshake. Once a new value has not been received that is one that the compare function determines as comparing true with an internally generated value within the user device, this will cause the program to flow from the decision block 1218 along an "N" path to the terminate block 1216.

Figure 13:
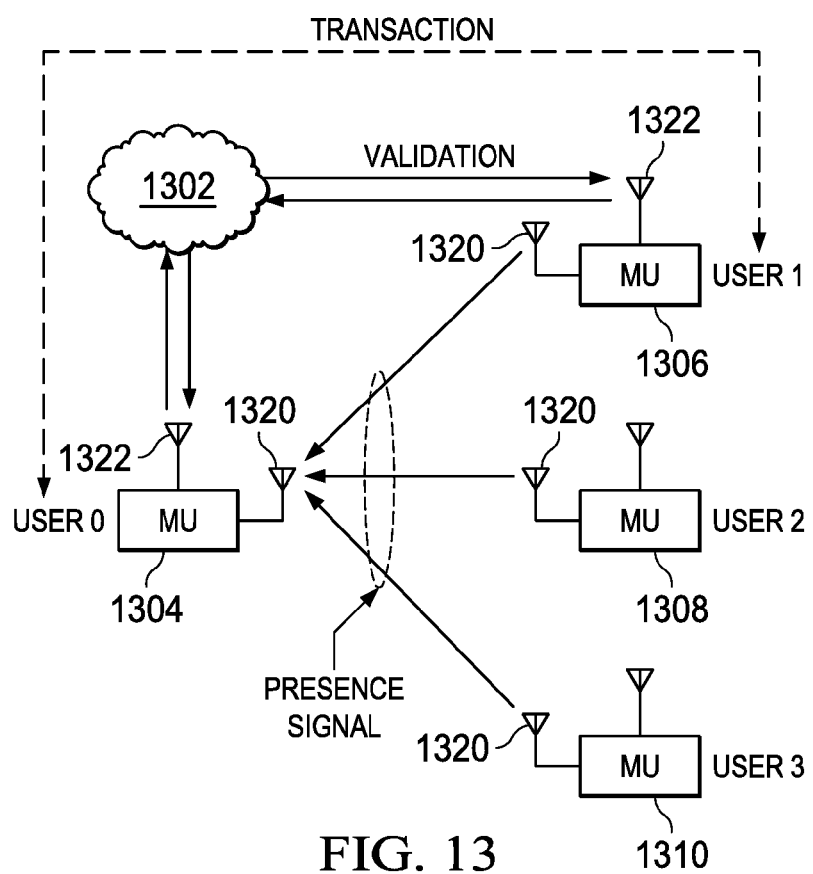
FIG. 13 illustrates an application with multiple mobile units.

Referring now to FIG. 13, there is illustrated a diagrammatic view of one example utilizing multiple MUs. There is illustrated a general public or private cloud 1302 that has associated with it the primary MU 1304 and a plurality of MUs 1306, 1308 and 1310. Associated with the MU 1304 is USER 0 and, similarly, MU 1306 is associated with a USER 1, MU 1308 is associated with a USER 2 and MU 1310 is associated with a USER 3. Each of the MUs 1304-1310 has associated therewith a broadcast antenna 1320, and a data antenna 1322 that is operable to communicate with cloud 1302.

In this example, the MU 1304 is operable to receive from each of the other MUs 1306-1310 a "presence" signal. This signal is the broadcast signal that indicates that the transmitting MU is running the appropriate application and is transmitting the "presence" signal in accordance with the proprietary application running on that MU. In this example, the MU 1306 is transmitting the presence signal to any receiving MU. The MU 1304 is also running the proprietary application and is set to receive a presence signal from any MU that is running the corresponding application. In this example, only the MU 1306 is transmitting the presence signal. As such, the MU 1304 will be receiving the presence signal from the MU 1306. Once the presence signal has been validated such that MU 1304 receives the presence signal, validates that presence signal in a manner that requires the MU 1304 to connect to the MU 1306 for the validation process. This requires the MU 1304 to transmit a signal to the antenna 1322 associated with the data radio of the MU 1306 to set up the communication path therebetween. In general, in order to obtain information as to how the MU 1306 knows how to communicate with the MU 1306, this can either be facilitated via information that is received from an external server (not shown) or it can be information contained in the presence signal.

Since the presence signal has been received by the MU 1304, this indicates the proximity of the MU 1306 to the MU 1304. The validation procedure is for the creation of the "validation path." It should be understood that there is a difference in concept between validating that any MU is operating in accordance with the proprietary program and sending the necessary information to create a handshake or validation path. All the presence signal does in this application is indicate that the MU 1306 is in proximity to the MU 1304. Thereafter, the validation path is created "through the cloud 1302." It is the maintaining of the validation path that allows a transaction to occur thereafter. In this example, there is first a determination of proximity followed by the creation of a validation. This requires there to be a valid data communication link available for both MUs and then a connection made between the two MUs. As long as this validation path is maintained, a subsequent transaction can then occur. In this example, the transaction is between USER 0 and USER 1 associated with the respective MUs 1304 and 1306.

For example, suppose that an MU came into proximity with another MU. Even though these are referred to as "mobile units," it should be understood that one of these units could be fixed. Suppose, for example, that one of these units was attached to a kiosk in the location of the transaction was supposed to occur with a user associated with another mobile unit that was associated with a user. All that is necessary is for proximity to be recognized and then a validation path set up. The validation path could be set up between two units, one being a mobile unit and one being a fixed unit. The validation path could be by a direct peer to peer connection utilizing dedicated radios or be connected, as in this example, via the cloud 1302. Once the validation path is completed and maintained, a transaction could occur. If, during this transaction, the validation path is broken, the transaction will not go forward.

In another example, there could actually be provided to mobile units associated with two different users. One could be a provider of goods or services and one could be the recipient of such goods or services. Once the one recipient comes into proximity with the provider, the two mobile units associated with these two individuals or users would then create a validation path therebetween and allow the provider to provide the goods or services to the recipient.

A Beacon Assisted Commercial Recognition System provides a system that requires the generation of a separate validation path between two nodes which, with the presence of the validation path, allows a communication path to be maintained between the two nodes. Upon breaking of the validation, the communication path will also be broken, such that the communication is dependent upon the validation path. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system, comprising:
   a primary communication path;
   a first communication device interfaced with the primary communication path;
   a second communication device interfaced with the primary communication path for communicating over the primary communication path to the first communication device;
   a controller for controlling the communication path between the first and second communication devices to allow or inhibit communication there over;
   a validation communication path for carrying validation information in the form of a bidirectional validation communication;
   a first validation node interfaced with the validation communication path;
   a second validation node interfaced with the validation communication path for communicating with the first validation node over the validation communication path wherein the presence of a transmission of bidirectional validation information between the first and second validation nodes over the validation communication path constitutes a validation condition and the controller is controlled by the presence of the validation communication of bidirectional validation information and the existence of the validation condition during control of communication by the controller of communication over the primary communication path to control a mode of operation of the communication over the primary communication path between the first communication device and the second communication device to be at least one of inhibiting communication over the primary communication path or allowing communication over the primary communication path;
   a beacon associated with the second communication device for broadcasting a beacon signal having unique properties and proximate in location to the second communication device; and
   a beacon receiver associated with the first validation node for receiving the beacon signal broadcast from the beacon and extracting unique information there from, the first validation node using the extracted unique information to validate the identity of the broadcast beacon signal and, upon validation of the unique information, the first validation node initiating a bidirectional validation communication with the second validation node over the validation communication path and the second validation node, upon receiving an initiated communication from the first validation node over the validation communication path causing the validation condition to be generated;
   whereupon, after validation, a continuous bidirectional communication handshake is established and maintained during control of communications over the primary communication path by the controller controlling bidirectional communication of information between the first validation node and the second validation node over the validation communication path so as to establish a continuous validation communication presence, the generation of the validation condition requiring a continuous validation communication presence.

2. The system of claim 1, wherein the first communication device and the first validation node are common to a mobile unit and fixed relative thereto.

3. The system of claim 2, wherein the second communication device and the second validation node are common to a fixed location and in close proximity to each other.

4. The system of claim 1, wherein the first communication device and the first validation device are not common to each other and not in a fixed relationship to each other.

5. The system of claim 1, wherein the handshake includes a proprietary communication protocol to be established between the first and second validation nodes and, wherein the first and second validation nodes are required to communicate with this proprietary communication protocol in order to establish the validation condition.

6. The system of claim 1, wherein the unique information associated with the beacon signal includes a beacon ID in addition to unique proprietary information associated with the validation operation.

7. A system, comprising:
   a primary communication path;
   a validation communication path for carrying validation information in the form of a validation communication;
   a mobile unit including:
     a first communication device interfaced with the primary communication path and including a transmitter and receiver for enabling thereover, a first validation node interfaced with the validation communication path and including a transmitter and receiver for enabling bidirectional communication thereover;

a transaction location including:
- a second communication device interfaced with the primary communication path for communicating over the primary communication path to the first communication device and having a transmitter and receiver for enabling such bidirectional communication,
- a second validation node interfaced with the validation communication path for communicating with the first validation node and having a transmitter and receiver for enabling such bidirectional communication, and
- a beacon transmitter associated with the second validation node for broadcasting a beacon signal over the validation communication path to the first validation node; and a controller for controlling the communication path between the first and second communication devices to allow or inhibit communication there over;

the receiver on the first validation node for receiving the beacon signal from the beacon transmitter associated with the second validation node and using information from the broadcast to validate the beacon signal against a predetermined validation database and, upon validation, initiating a validation communication with the second validation node;

whereupon, after validation, a continuous bidirectional communication handshake is established and maintained during control of communications over the primary communication path by the controller controlling bidirectional communication of information between the first validation node and the second validation node over the validation communication path so as to establish a continuous validation communication presence, the generation of the validation condition requiring a continuous validation communication presence;

wherein the presence of a bidirectional validation communication of validation information between the first and second validation nodes over the validation communication path constitutes a validation condition and the controller is controlled by the presence of the bidirectional validation communication of validation information and the existence of the validation condition during a control of communications by the controller of communications over the primary communication path to control a mode of operation of the communication over the primary communication path between the first communication device and the second communication device to be at least one of inhibiting communication over the primary communication path or allowing communication over the primary communication path;

wherein the beacon transmitter is associated with a beacon associated with the second communication device, the beacon transmitter for broadcasting the beacon signal, and the beacon transmitter having unique properties and disposed proximate in location to the second communication device; and wherein a beacon receiver is associated with the first validation node, the beacon receiver being for receiving the beacon signal broadcast from the beacon and extracting unique information therefrom, the first validation node using the extracted unique information to validate an identity of the broadcast beacon signal from the validation database and, upon validation of the unique information, the first validation node initiating a bidirectional validation communication with the second validation node over the validation communication path and the second validation node, upon receiving an initiated communication from the first validation node over the validation communication path causing the validation condition to be generated.

8. The system of claim 7, wherein the handshake includes a proprietary communication protocol to be established between the first and second validation nodes and, wherein the first and second validation nodes are required to communicate with this proprietary communication protocol in order to establish the validation condition.

9. The system of claim 7, wherein the unique information associated with the beacon signal includes a beacon ID in addition to unique proprietary information associated with the validation operation.

* * * * *